(12) United States Patent
Raber

(10) Patent No.: US 8,006,647 B2
(45) Date of Patent: Aug. 30, 2011

(54) GROOMING TOOL

(76) Inventor: Emmanuel Raber, Imperial, MO (US)

( * ) Notice: Subject to any disclaimer, the term of this patent is extended or adjusted under 35 U.S.C. 154(b) by 171 days.

(21) Appl. No.: 11/954,391

(22) Filed: Dec. 12, 2007

(65) Prior Publication Data
US 2009/0151648 A1    Jun. 18, 2009

(51) Int. Cl.
*A01K 13/00* (2006.01)
(52) U.S. Cl. ......................... 119/603; 119/664
(58) Field of Classification Search .......... 119/600, 119/601, 603, 604, 611, 612, 619, 652, 664; 15/160; 401/184
See application file for complete search history.

(56) References Cited

U.S. PATENT DOCUMENTS

| | | | |
|---|---|---|---|
| 1,191,578 A | 7/1916 | Englund | |
| 2,250,878 A | 7/1941 | Quaranti | |
| 2,502,937 A * | 4/1950 | Franklin et al. | 401/14 |
| 3,721,250 A * | 3/1973 | Walter et al. | 132/112 |
| 3,955,238 A | 5/1976 | Remijas | |
| 3,965,527 A | 6/1976 | George | |
| 4,027,984 A | 6/1977 | Underwood | |
| 4,066,366 A | 1/1978 | Reynolds | |
| 4,236,840 A * | 12/1980 | Kennedy | 401/42 |
| 4,319,852 A * | 3/1982 | Bell et al. | 401/185 |
| D266,112 S | 9/1982 | Culp | |
| 4,495,958 A * | 1/1985 | Roeder | 132/113 |
| 4,617,875 A | 10/1986 | Holland | |
| 4,685,423 A | 8/1987 | Baker et al. | |
| 4,779,572 A | 10/1988 | Freulon | |
| 4,922,859 A | 5/1990 | Durell et al. | |
| 4,934,855 A * | 6/1990 | Recchelbacher | 401/137 |
| 4,958,596 A | 9/1990 | Belan | |
| 5,009,195 A | 4/1991 | Damm | |
| 5,067,444 A * | 11/1991 | Parker | 119/606 |
| 5,109,553 A | 5/1992 | Kishimoto | |
| 5,211,131 A | 5/1993 | Plyler | |
| 5,213,432 A * | 5/1993 | Chappell | 401/273 |
| 5,339,840 A | 8/1994 | Koppel | |
| 5,365,880 A | 11/1994 | South | |
| 5,365,881 A | 11/1994 | Sporn | |
| 5,379,723 A | 1/1995 | Branley | |

(Continued)

FOREIGN PATENT DOCUMENTS
EP        0353001 A2 *   1/1990
(Continued)

*Primary Examiner* — Son T. Nguyen
*Assistant Examiner* — Shadi Baniani
(74) *Attorney, Agent, or Firm* — Polster Lieder Woodruff & Lucchesi, L.C.

(57) ABSTRACT

An animal grooming tool. The animal grooming tool comprises a handle having a proximal end, a distal end and a gripping portion disposed between the proximal end and the distal end. The handle delimits an internal channel disposed therein. The tool also comprises a brush head integrally attached to the distal end and extending therefrom, the brush head further delimiting the internal channel disposed therein. The brush head has a top wall, a bottom wall and sidewalls connecting the top wall and the bottom wall. The bottom wall includes a plurality of openings defined therethrough and communicating with the channel. The tool further comprises a stabilizer inserted into and extending within the channel. The stabilizer has an open first end, a closed second end and a body disposed between the open first end and the closed second end. The body has a plurality of apertures defined therethrough and aligned with the openings of the bottom wall. During operation, fluid discharges through the open first end flows through the plurality of apertures and out of the plurality of openings and onto the animal.

17 Claims, 3 Drawing Sheets

U.S. PATENT DOCUMENTS

| | | |
|---|---|---|
| 5,502,873 A | 4/1996 | Hogan |
| 5,626,099 A | 5/1997 | Staller |
| 5,655,482 A | 8/1997 | Lundquist |
| 5,762,433 A * | 6/1998 | Cary .................... 401/184 |
| 5,768,709 A | 6/1998 | Newkirk et al. |
| 6,082,307 A | 7/2000 | Landreneau |
| D438,708 S | 3/2001 | Weiner |
| 6,230,659 B1 | 5/2001 | Karlsson |
| 6,367,421 B1 * | 4/2002 | Deacon .................... 119/603 |
| 6,718,913 B1 * | 4/2004 | Stupar .................... 119/602 |
| 6,782,846 B1 | 8/2004 | Porter |
| 6,827,039 B1 | 12/2004 | Nelson |
| 6,935,579 B1 | 8/2005 | Lindsey |
| 6,948,451 B2 | 9/2005 | Bond |
| 6,990,705 B1 | 1/2006 | Schouten et al. |
| 7,077,076 B2 | 7/2006 | Porter et al. |
| 7,128,490 B2 | 10/2006 | McEwan |
| 7,140,325 B2 | 11/2006 | Lowe et al. |
| 7,179,162 B1 | 2/2007 | Twiner |
| 7,182,043 B1 * | 2/2007 | Nelson .................... 119/604 |
| 7,222,588 B2 | 5/2007 | Porter |
| 2002/0166511 A1 * | 11/2002 | Porter .................... 119/604 |
| 2002/0189049 A1 | 12/2002 | Freidell |
| 2006/0185615 A1 | 8/2006 | Gorin |
| 2008/0178823 A1 * | 7/2008 | Hurwitz .................... 119/603 |

FOREIGN PATENT DOCUMENTS

| | | |
|---|---|---|
| JP | 403201919 A * | 9/1991 |
| WO | WO 2005072519 A1 * | 8/2005 |

* cited by examiner

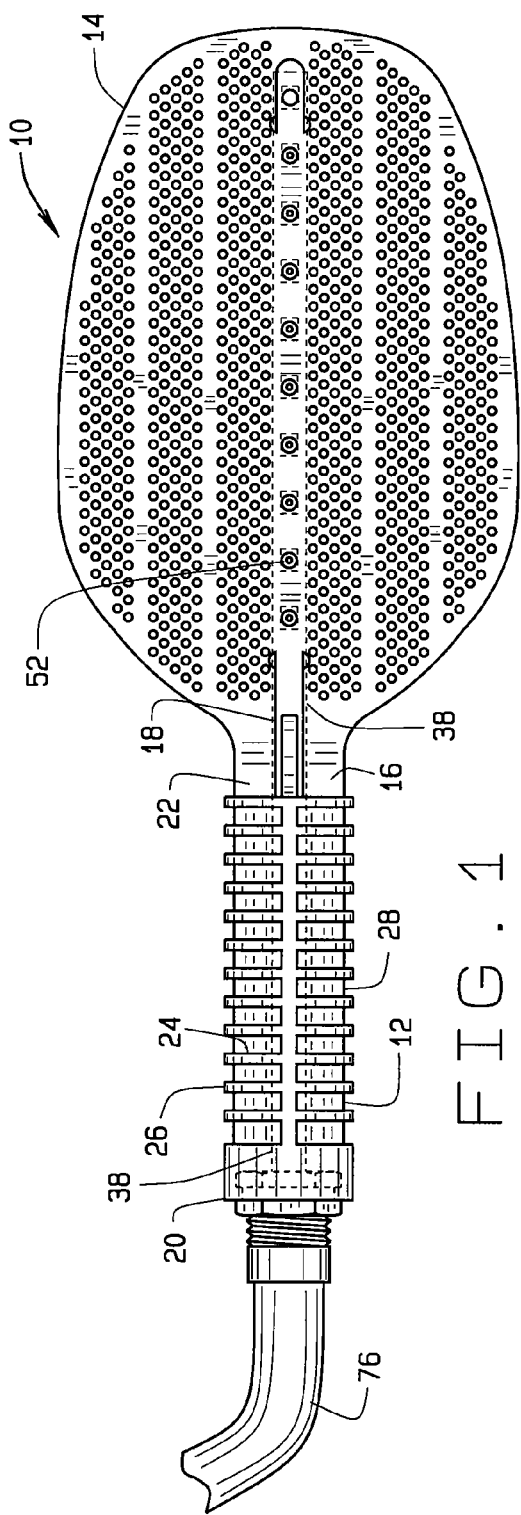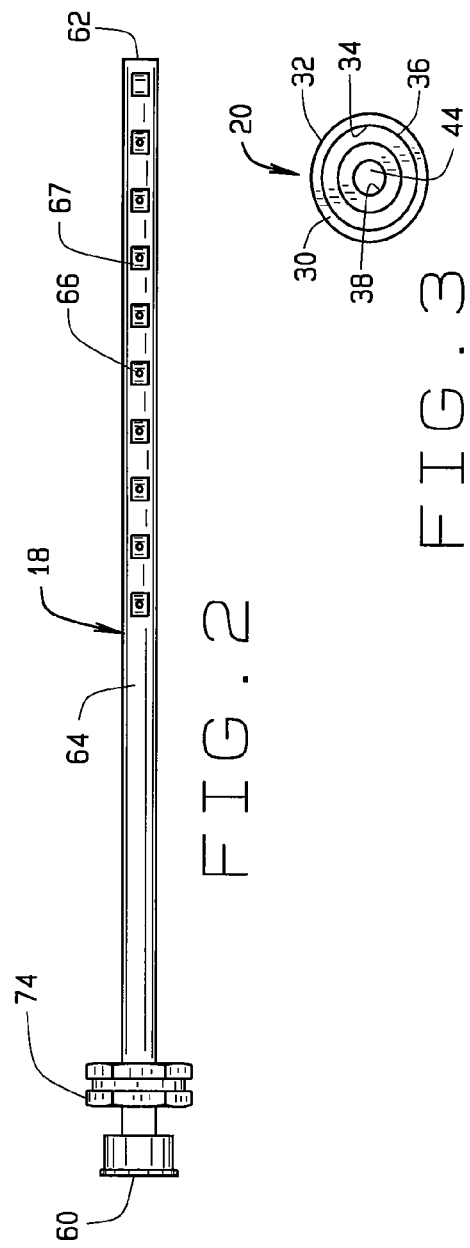

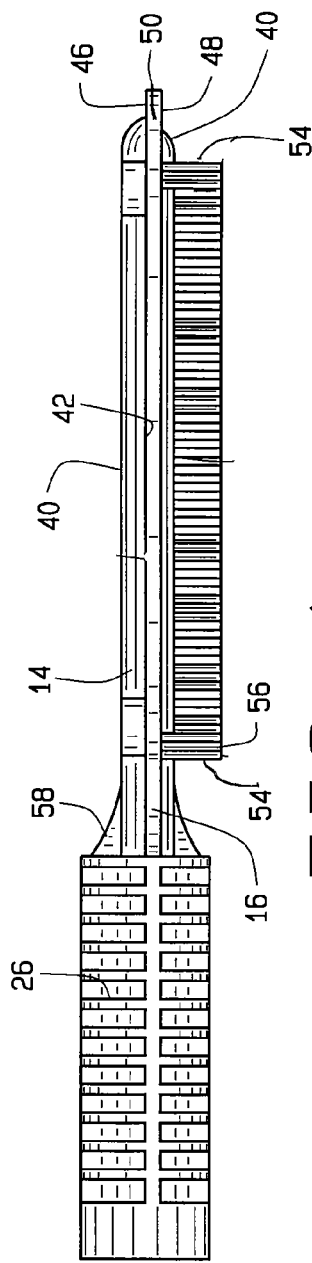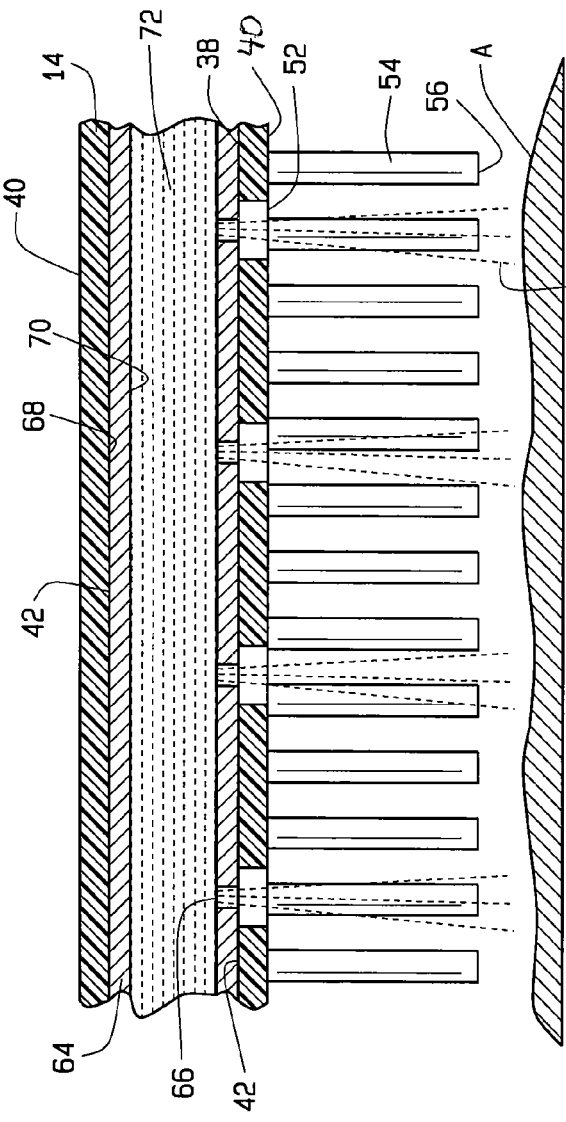

GROOMING TOOL

CROSS-REFERENCE TO RELATED APPLICATIONS

Not Applicable

STATEMENT REGARDING FEDERALLY SPONSORED RESEARCH

Not Applicable.

BACKGROUND OF THE DISCLOSURE

Animals, such as horses, require routine care such as washing and grooming. In addition to the improvement in the animal's appearance, such care helps to maintain the animal's general health. For example, frequent or periodic washing and grooming removes insect pests. Grooming also removes tangled and matted hair which can get caught on an object, causing the hair or even skin to be torn. Proper care also reduces animal odor which attracts a variety of dangerous and annoying pests. Grooming also enables the animal's skin and coat to be examined for indications of damage which need treatment, allowing preventive measures to be taken. Accordingly, animal handlers clean and groom large animals on a routine basis to maintain the well being of the animals and/or to prepare the animals for showing.

Current washing and/or grooming brushes often break at the brush neck due to the pressure applied by the handler to the brushes during the grooming process. Additionally, current brushes bend too easily under the handler's pressure thereby limiting water flow through the handle and reducing the washing benefits of these handles. Accordingly, animal handlers require stiff and reinforced brushes that allow for uniform water flow for proper animal care.

SUMMARY

The present disclosure relates to an animal husbandry tool, and in one application, a reinforced animal grooming brush. In one aspect, the animal grooming tool comprises a handle having a proximal end, a distal end and a gripping portion disposed between the proximal end and the distal end. The tool also comprises a brush head integrally attached to the distal end and extending therefrom. The brush head has a top wall, a bottom wall and sidewalls connecting the top wall and the bottom wall. A channel extends through the handle and the brush head. The bottom wall includes a plurality of openings extending therethrough and communicating with the channel.

The tool also comprises a stabilizer inserted into and extending within the channel. The stabilizer has an open first end, a closed second end and a body disposed between the open first end and the closed second end. The body has a plurality of apertures defined therethrough. During operation, the plurality of apertures arranged with the plurality of openings of the brush head such that fluid discharged through the open first end of the stabilizer flows through the plurality of apertures, out of the plurality of openings and onto the animal.

BRIEF DESCRIPTION OF THE SEVERAL VIEWS OF THE DRAWINGS

In the accompanying drawings which form part of the specification:

FIG. 1 is a plan view of a grooming tool constructed in accordance with and embodying the present disclosure illustrating the grooming tool connected to a fluid source;

FIG. 2 is a plan view of a stabilizer constructed in accordance with and embodying the present disclosure illustrating apertures disposed along a body of the stabilizer;

FIG. 3 is an open end view of the grooming tool;

FIG. 4 is a side elevational view of the grooming tool illustrating a handle, neck and brush head of the grooming tool;

FIG. 5 is a partial cross-sectional view of the stabilizer of FIG. 2 positioned within the brush head of FIG. 4 illustrating fluid being discharged out of the stabilizer and brush head and onto a portion of an animal.

Corresponding reference numerals indicate corresponding parts throughout the several figures of the drawings.

DESCRIPTION OF THE PREFERRED EMBODIMENT

Figure 6:
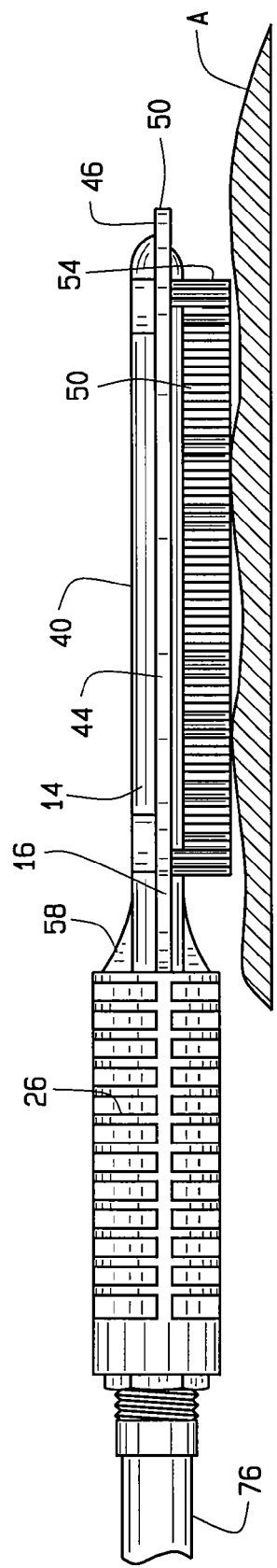
FIG. 6 illustrates a side elevational view of the tool being applied against the portion of the animal.

The following detailed description illustrates the grooming tool by way of example and not by way of limitation. The description clearly enables one skilled in the art to make and use the tool, describes several embodiments, adaptations, variations, alternatives, and uses of the tool, including what is presently believed to be the best mode of carrying out the invention.

The present disclosure relates to an animal husbandry tool, wherein the tool can be used in any appropriate grooming device. However, for purposes for illustrations only, the tool will be described as incorporated into an animal grooming brush. Referring to the drawings, a grooming tool 10 (FIG. 1) of the present disclosure can be made from a variety of materials, such as but not limited to, polypropylene, polyethylene, other appropriate thermal plastic materials or metal. Further, the tool 10 can have a variety of shapes such as elliptical, oval, circular, triangular, square, rectangular or other appropriate configuration. The tool 10 can be of any size to accommodate users and/or animals of any size.

The tool 10 comprises a handle 12, a brush head 14 and a neck 16 disposed between the handle 12 and the brush head 14. As shown, the tool 10 further comprises a stabilizer 18 (FIG. 2) insertable within the handle 12, the neck 16 and the brush head 14 (FIG. 1). The stabilizer 18 provides rigidity and stabilization to the handle 12, the brush head 14 and the neck 16 during use of the tool 10.

In the embodiment shown, the handle 12, brush head 14 and neck 16 are integrally connected with each other. Optimally, the handle 12, brush head 14 and neck 16 are formed in the same mold. In another embodiment (not shown), the brush head 14 removably connects to the neck 16. In this other embodiment, the connectivity allows for different configurations of the brush head 14 to be attached to the handle 12 via the neck 16.

Referring to FIG. 1, the handle 12 comprises a proximal end 20, a distal end 22 and a gripping portion 24 disposed between the proximal end 20 and the distal end 22. The gripping portion 24 optimally includes grooves 26 and/or flange portions positioned around an outer surface 28 of the gripping portion 24. These grooves/flanges 26 provide the user with an ergonomic fit to assist the user in handling the gripping portion 24. The gripping portion 24 can be formed of a soft material to make the gripping of the handle 12 more comfortable. Any number of grooves 26 easily used for the intended purposes is acceptable. The proximal end 20 has an open circular face 30 (FIG. 3) that includes an outer surface 32 and an inner surface 34. The inner surface 34 is offset with respect to the outer surface 32 as measured from the proximal end 20 to define a recessed seat 36 positioned within the proximal end 20.

Referring to FIG. 4, the brush head 14 extents outwardly from the distal end 22 of the handle 12. The brush head 14 has a top wall 46, a bottom wall 48 and side walls 50 connecting the top wall 46 and the bottom wall 48. The brush head 14 may have any shape desired such as but not limited to rectangular, triangular, circular or oval.

As shown in FIGS. 1 and 3-5, a channel 38 extends through the tool 10 from the proximal end 20 of the handle 12, through the neck 16 and into the brush head 14. Accordingly, the neck 16 and brush head 14 further define the internal channel 38 disposed therein. Referring to FIG. 5, the channel 38 includes an outer wall 40 and an inner wall 42. Optimally, the outer wall 40 and the inner wall 42 are tubular shaped. The inner tubular wall 42 defines a passageway 44 (FIG. 3) therein. The channel 38 is shown to have a generally circular smooth cross-sectional configuration along the length of the channel 38. The channel 38 can have other configurations. At one end of the channel 38, the channel 38 opens out of the recessed seat 36, at which the diameter of the channel 38 is less than the diameter of the inner surface 34 of the proximal end 20 (FIG. 3). The channel 38 is closed at the other end which is positioned within the brush head 14.

The outer tubular wall 40 of the channel 38 extends upwardly beyond the top wall 46 of the brush head 14. The outer tubular wall 40 also extends downwardly beyond the bottom wall 48 of the brush head 14. Stated differently, the channel wall 40 has an outer diameter greater than the thickness of the brush side wall 50. The channel portion of the outer tubular wall 40 extending beyond the bottom wall 48 includes a plurality of openings 52 (FIG. 5) defined therethrough and in communication with the passageway 44 of the channel 38. The openings 52 open out of the bottom wall 48 of the brush head 14. As shown, the openings 52 extend in a single row along the length of the brush head 14 and beyond the neck 16 as measured from the handle 12.

In other embodiments (not shown), the openings 52 can be arranged in any suitable arrangement, such as multiple staggered rows or non-staggered rows. Any arrangement, however, that is easily used for its intended purpose is acceptable. In one embodiment, the outer tubular wall 40 has ten openings 52 along the bottom wall 48. The number of openings 52, however, is representative of an embodiment and is not intended to limit the scope of the disclosure and more or fewer openings 52 can be provided as desired.

As shown, bristles 54 (FIGS. 4-6) extend downwardly from the bottom wall 48 and around the tubular wall 40 52. Each end of the bristles 54 comprises working surfaces 56 that the user applies to an animal "A". Optimally, the bristles 54 comprise a rigid material such as plastic. The bristles 54 are arranged in any suitable configuration such as uniform or non-uniform patterns along the bottom wall 48. The number of and the configuration of the bristles 54 are representative of an embodiment and are not intended to limit the scope of the disclosure.

Referring to FIG. 4, the neck 16 is integral with the handle 12 and to the brush head 14. As shown, the neck 16 includes a generally flat body. The neck 16 includes at least one support rib 58 which can be molded from the same material as the neck 16. In one embodiment, the neck 16 includes ribs 58 positioned on opposing sides of the neck 16. The ribs 58 extend from the gripping portion 24 to the outer tubular wall 40 of the channel 38. The ribs 58 provide support resistance against pressure applied by the user to the handle 12 during operation of the tool 10 as will be discussed. Any supporting member that can be employed to support/stabilize the neck 16 is intended to be within the scope of the disclosure. As shown, the outer tubular wall 40 of the channel 38 extends upwardly beyond the top of the neck 16. The outer tubular wall 40 also extends downwardly beyond the bottom of the neck 16.

Returning to FIG. 2, the stabilizer 18 has an open first end 60, a second end 62 and a hollow body 64 disposed between the open first end 60 and the closed second end 62. Optimally, the second end 62 is closed. As shown, the body 64 has a plurality of apertures 66. In one embodiment, the apertures 66 include nozzle shaped ends 67. The body 64 has an outer wall 68 and an inner wall 70 (FIG. 5) defining an internal and hollow conduit 72 therethrough. The conduit 72 operatively communicates with the open first end 60 and the plurality of apertures 66. As shown, the plurality of apertures 66 aligns in a single row along the stabilizer 18. In other embodiments (not shown), the apertures 66 align in any suitable arrangement, such as multiple staggered rows or non-staggered rows. Any arrangement of the apertures 66, however, that is easily used for its intended purpose is acceptable. In one aspect of the disclosure, the body has ten apertures 66 along the stabilizer 18. The number of apertures 66, however, is representative of an embodiment and is not intended to limit the scope of the disclosure and more or fewer apertures 66 can be provided as discussed.

The stabilizer 18 also includes a fastener 74 (FIG. 2) that is slidable along the open first end 60. The fastener 74 optimally includes a fitting, e.g., a quick-connect or threaded fitting, among others, for attaching the tool 10 to a fluid source 76 (FIG. 1), such as a hose, e.g., a garden-type hose.

During one mode of manufacture of the tool 10, the stabilizer 18 is placed into a mold (not shown) for the handle 12, the neck 16 and the brush head 14 via a mold portion of the channel 38. During the molding process of the tool 10, the channel 38 forms around the stabilizer 18 to embed the stabilizer 18 within the tool 10 such that the plurality of apertures 66 are arranged optimally to align with the plurality of openings 52 of the brush head 14. Optimally, the openings 52 are larger than the apertures 66 to fully expose the apertures 66 and the associated nozzle shaped ends 67.

In another method of forming the tool 10, the stabilizer inserts within the channel 38 such that the stabilizer apertures 66 are exposed within the channel 38. In this embodiment, the stabilizer 18 can be positioned and/or suspended within the channel 38 by fasteners such as clips that connect the second end 62 and/or the body 64 of the stabilizer 18 to the inner wall 42 of the channel 38. In this configuration, the apertures 66 can be exposed to the passageway 44 of the channel 38. In other words, the passageway 44 is positioned between the apertures 66 and the openings 52. Still further, in another embodiment, the stabilizer 18 removably inserts within the channel 38.

During one mode of operation of the tool 10, the user grasps the gripping portion 24 of the handle 12. The user then removably connects the fastener 74 to the fluid source 76. The fluid source 76 discharges fluid 78 through the stabilizer 18, such that the fluid 78 passes through the stabilizer apertures 66 and out of the brush head openings 52. In one aspect, the fluid source 76 discharges the fluid 78 axially through the stabilizer 18, within the conduit 72 and radially out of the apertures 66 and the openings 52. The openings 52 and apertures 66 may be configured to direct fluid out of the conduit 72 so as to form a converging pattern via the nozzle shaped ends 67 of the apertures 66. Of course, openings 52 and apertures 66 may be configured to direct fluid in a non-converging pattern. Those skilled in the art will understand the variety of spray patterns possible and how to implement the spray pattern(s) chosen for a particular application of the tool 10. The discharged fluid 78 then contacts the animal A.

The fluid 78 may comprise a variety of liquids such as water or a cleaning solution. The fluid 78 may also comprise air or other gases. The fluid source 76 optimally provides positive fluid flow to discharge the fluid 78 through the stabilizer 18. The fluid source 76 may also include negative fluid flow in the form a vacuum. In this embodiment, the fluid source 76 may vacuum any fluid 78 discharged onto the animal A or any debris existing on the animal A. Regardless of the type of fluid 78 and the operating condition of the fluid source 76, the user at any time can apply the rigid bristles 54 against the animal A.

The rigid construction of the handle 12, the brush head 14, the neck 16 and the embedded stabilizer 18 allows the user to apply force of the brush head 14 and/or bristles 54 against the animal A without breaking the tool 10. The inserted stabilizer 18 provides a rigid and reinforced configuration within the tool 10 to resist pressure applied by the user when grooming the animal A. Furthermore, the ribs 58 of the neck 16 provide support to resist pressure applied against the animal A and in particular the pressure that transmits to the reduced cross sectional area of the neck 16. These stiffening factors also minimize or eliminate flexing of the brush head 14 and neck 16 while the user applies the brush head 14 against the animal A. Thus, the rigid stabilizer 18 also allows the fluid 78 to efficiently travel within conduit 72 and out of the apertures 66 and respective openings 52 since the stabilizer 18 does not bend within the channel 38.

The grooming tool 10 may be adapted for use with animals of various sizes. For example, in one configuration, grooming tool 10 may be sized and/or shaped for grooming large animals, such as horses, cattle and other similarly sized livestock.

As various changes could be made in the above constructions without departing from the scope of the disclosure, it is intended that all matter contained in the above description or shown in the accompanying drawings shall be interpreted as illustrative and not in a limiting sense.

Moreover, the use of the terms "upper" and "lower" or "top" or "bottom" or "upwardly" or "downwardly" and variations of these terms is made for convenience, but does not require any particular orientation of the components.

I claim:

1. A tool for grooming an animal, the tool comprising:
a handle having a proximal end, a distal end and a gripping portion disposed between the proximal end and the distal end;
a brush head extending from the distal end of the handle, the brush head having a top wall, a bottom wall and sidewalls connecting the top wall and the bottom wall, the top wall and bottom wall having a width greater in length than a width of the gripping portion while the sidewalls have a height shorter in length than a height of the gripping portion to form an end flatter than the gripping portion;
a straight channel extending through the handle and the brush head, the straight channel having an outer wall that extends upwardly beyond the top wall and that extends downwardly beyond the top wall such that the channel is configured to have a diameter greater in length than the height of the sidewalls of the brush head and shorter in length than the height of the gripping portion, the outer wall portion that extends downwardly from the top wall includes a plurality of openings defined therethrough; and
a straight stabilizer inserted into and extending through the straight channel, the straight stabilizer having an open first end, a closed second end and a body disposed between the open first end and the closed second end, the body having a plurality of apertures defined therethrough, the plurality of apertures aligning with the plurality of openings of the straight channel wherein fluid discharged through the open first end flows axially within the body, radially through the plurality of apertures and out of the plurality of openings and onto the animal.

2. The tool of claim 1 further comprising a neck integral with and positioned between the handle and the brush head.

3. The tool of claim 2 wherein the neck includes a support rib.

4. The tool of claim 2 wherein the handle, the neck and the brush head are rigidly formed.

5. The tool of claim 1 further comprising rigid bristles extending outward from the bottom wall of the brush head and around the openings.

6. The tool of claim 1 wherein the plurality of openings are positioned in a single row along the length of the brush head and beyond the handle.

7. The tool of claim 6 wherein the plurality of apertures are positioned in a single row along the straight stabilizer.

8. The tool of claim 1 wherein each aperture includes nozzle shaped ends.

9. The tool of claim 1 wherein the straight stabilizer has an outer wall and an inner wall defining a conduit therethrough, the conduit being in operative communication with the open first end and the plurality of apertures.

10. The tool of claim 1 wherein the proximal end of the handle has a recessed seat that contacts the straight stabilizer when the straight stabilizer inserts within the straight channel.

11. A tool connectable with a fluid source for grooming an animal, the tool comprising:
a rigid handle having a proximal end, a distal end and a gripping portion disposed between the proximal end and the distal end, the proximal end having a recessed seat;
a rigid brush head integrally attached to the handle distal end and extending therefrom, the rigid brush head having a top wall, a bottom wall and sidewalls connecting the top wall and the bottom wall, the top wall and bottom wall having a width greater in length than a width of the gripping portion while the sidewalls have a height shorter in length than a height of the gripping portion to form an end flatter than the gripping portion;
a channel extending through the handle and the brush head, the channel having an outer wall that extends upwardly beyond the top wall and that extends downwardly beyond the top wall such that the channel is configured to have a diameter greater in length than the height of the sidewalls of the brush head and shorter in length than the height of the gripping portion, the outer wall portion that extends downwardly from the top wall includes a plurality of openings defined therethrough, the plurality of openings are positioned in a single row along the length of the rigid brush head; and
a rigid stabilizer inserted into and extending into the channel, the rigid stabilizer comprises a body having an open first end, a closed second end and a plurality of apertures, the open first end being in contact with the recessed seat of the rigid handle, the plurality of apertures being positioned in a single row along the rigid stabilizer and beyond the rigid handle and being aligned with the plurality of openings of the rigid brush head wherein fluid discharged by the fluid source flows axially through the open first end and flows radially through the plurality of apertures and out of the plurality of openings.

12. The tool of claim 11 further comprising a rigid neck integrated with and positioned between the handle and the brush head.

13. The tool of claim 12 wherein the rigid handle, the rigid brush head and the rigid neck are made from a plastic material.

14. The tool of claim 11 wherein the rigid stabilizer comprises a metal material.

15. The tool of claim 11 wherein the rigid stabilizer has an outer wall and an inner wall defining a conduit therethrough, the conduit being in operative communication with the open first end and the plurality of apertures.

16. The tool of claim 11 wherein the rigid stabilizer includes a fastener positioned around the open first end, the fastener being configured to be removably connected to the fluid source.

17. The tool of claim 11 wherein the apertures include nozzle shaped ends.

* * * * *